US009864942B2

(12) United States Patent
Rakoczy et al.

(10) Patent No.: US 9,864,942 B2
(45) Date of Patent: Jan. 9, 2018

(54) PORTABLE TABLE NUMBER DEVICE AND TABLE NUMBER SYSTEM

(71) Applicants: ALMOS TECHNOLOGIES PTY. LTD., Fremantle, Western Australia (AU); Steve Rakoczy, Perth, Western Australia (AU)

(72) Inventors: Steve Rakoczy, Perth (AU); Steven Thomas McGuinness, Perth (AU)

(73) Assignee: Almos Technologies Pty. Ltd., Fremantle (AU)

(*) Notice: Subject to any disclaimer, the term of this patent is extended or adjusted under 35 U.S.C. 154(b) by 325 days.

(21) Appl. No.: 14/426,896

(22) PCT Filed: Sep. 12, 2013

(86) PCT No.: PCT/EP2013/068883
§ 371 (c)(1),
(2) Date: Mar. 9, 2015

(87) PCT Pub. No.: WO2014/041056
PCT Pub. Date: Mar. 20, 2014

(65) Prior Publication Data
US 2015/0286917 A1 Oct. 8, 2015

(30) Foreign Application Priority Data

Sep. 13, 2012 (EP) ..................................... 12184294

(51) Int. Cl.
*G06K 19/07* (2006.01)
*G06Q 50/12* (2012.01)
(Continued)

(52) U.S. Cl.
CPC ..... *G06K 19/0725* (2013.01); *G06K 7/10297* (2013.01); *G06K 19/07749* (2013.01);
(Continued)

(58) Field of Classification Search
CPC ......... G06K 19/0725; G06K 19/07749; G06K 19/07758; G06K 7/10297; G06Q 30/0633; G06Q 30/0635; G06Q 50/12
See application file for complete search history.

(56) References Cited

U.S. PATENT DOCUMENTS

| | | | |
|---|---|---|---|
| 2008/0004985 A1* | 1/2008 | Kang | G06Q 30/06 705/26.81 |
| 2008/0288357 A1* | 11/2008 | Stambaugh | G06Q 10/06 705/15 |
| 2012/0206237 A1* | 8/2012 | Lovegreen | H04Q 9/00 340/10.1 |

* cited by examiner

*Primary Examiner* — Nay Tun
(74) *Attorney, Agent, or Firm* — Marcus C. Dawes; Daniel L. Dawes

(57) ABSTRACT

A portable table number device, comprising a housing having a bottom side with an outer edge arranged to rest on a table surface, said housing comprising a power source, an RFID reader arranged to detect an RFID table ID tag on or under said table surface, computer memory means comprising a table number device ID, wireless communication means arranged to wirelessly communicate a detected RFID tag table ID by said RFID reader together with said table number device ID to an external table number receiving device, a surface proximity sensor, such as a light sensor or micro-switch arranged in a recessed portion of said housing within said outer edge, said surface proximity sensor having a first state wherein no proximate surface is detected and a second state wherein a proximate surface is detected, said second state occurring if said bottom side of said housing is placed on said table surface, and power management means arranged to keep said RFID reading device in a sleep mode wherein no or relatively little power is used until the state of said surface proximity sensor changes from said first state to said second state, to power up said RFID reader temporarily for a period of time if the state of said proximity sensor
(Continued)

changes from said first state to said second state, said period of time being long enough to enable said RFID reader to identify an RFID tag and transmit it to said external table number receiving device, and to put said RFID reader in said sleep mode after said period of time lapses.

12 Claims, 2 Drawing Sheets

(51) Int. Cl.
  *G06K 19/077*  (2006.01)
  *G06Q 30/06*  (2012.01)
  *G06K 7/10*  (2006.01)

(52) U.S. Cl.
  CPC ... *G06K 19/07758* (2013.01); *G06Q 30/0633* (2013.01); *G06Q 30/0635* (2013.01); *G06Q 50/12* (2013.01)

PORTABLE TABLE NUMBER DEVICE AND TABLE NUMBER SYSTEM

The invention relates to a portable table number device.

In restaurants or cafés having a central counter where clients order and/or pay for meals or drinks, the clients are given a pod or the like displaying a number and choose a table to wait for their order to be served to them. Such a pod or the like is commonly called a "table number". The pod is placed on the chosen table, visible for the waiters. When the order is ready to be served, the waiter reads the order number on the printed slip and searches the restaurant or café for the table with the corresponding pod on it, and serves the order to the client. A more appropriate name for the "table number" would be "order number", but in this document we will follow the usual terminology of the industry.

In large restaurants or cafés this raises the problem that it takes waiters a relatively long period of time to find the right table number. Therefor it would be advantageous to use electronic tracking of the table numbers. Such a solution, based on RFID (Radio Frequency Identification) technique is described in US 2008/0288357 A1, whereby each table has an RFID tag and the table number device incorporates an RFID reader. However, for such a system to be commercially viable, the RFID readers have to operate for extended periods of time, while the operation of an RFID reader requires substantial amount of power. The invention aims at an efficient, reliable solution of this problem.

According to the invention the table number device comprises a housing having a bottom side with an outer edge arranged to rest on a table surface, said housing comprising a power source, an RFID reader arranged to detect an RFID table ID tag on or under said table surface, computer memory means comprising a table number device ID, wireless communication means arranged to wirelessly communicate a detected RFID tag table ID by said RFID reader together with said table number device ID to an external table number receiving device, a surface proximity sensor, such as a light sensor or a micro-switch, arranged in a recessed portion of said housing within said outer edge, said surface proximity sensor having a first state wherein no proximate surface is detected and a second state wherein a proximate surface is detected, said second state occurring if said bottom side of said housing is placed on said table surface, and power management means arranged to keep said RFID reading device in a sleep mode wherein no or relatively little power is used until the state of said surface proximity sensor changes from said first state to said second state, to power up said RFID reader temporarily for a period of time if the state of said light sensor changes from said first state to said second state, said period of time being long enough to enable said RFID reader to identify an RFID tag and transmit it to said external table number receiving device, and to put said RFID reader in said sleep mode after said period of time lapses. The invention in particular relates to a table number system comprising a multitude of said table number devices, each table number device having a unique device ID, a multitude of RFID table number tags, and a table number receiving device arranged to wirelessly receiving said pairs of RFID tag table numbers and device IDs and to communicate said pairs of device IDs and RFID tag table numbers, or the location thereof, to users of said table number system. Said table number receiving device is for instance a computer comprising software for managing client orders, such as restaurant or café orders.

Preferably said surface proximity sensor is a light sensor, wherein said first state is a state wherein relatively much light is detected, and said second state is a state wherein relatively little or no light is detected.

Said wireless communication means may for instance be WiFi communication means. Said power source may for instance be a battery or a solar panel. The RFID tag reader uses a relatively large amount of power, but by using a power management means in accordance with the invention the table number devices can be used with small, compact batteries or even "supercap" type capacitors in a reliable manner for long periods of time. The RFID reader is only powered for a short period of time after the device touches the table surface. Using a customer operated device, such as a power switch, would not be practical as it would require cooperation by the customers. When the devices are not used, they may be placed on any surface where they sit idle or they may be put on a wireless charging surface.

Said power management means is preferably arranged to put said RFID reader in said sleep mode once said RFID tag identification has been completed even if said period of time has not yet lapsed. Said power management means is further preferably arranged to keep the communication means in a sleep mode in sync with the RFID reader.

Said housing is preferably provided with a visible identifier representing said unique device ID, such as a number, which is readable for an average person at a distance of at least several meters. In a preferred embodiment said visible identifier is attached to said housing by means of an upright post.

Each table number device preferably comprises at least two of said surface proximity sensors a distance apart, and the power management means is arranged to power up the RFID reader for said period of time if the state of both of said surface proximity sensors changes from said first state to said second state. By using at least two sensors accidental powering of the RFID reader if for instance a user covers the sensor with a hand, is prevented.

The invention will now be exemplified by means of a preferred embodiment, with reference to the figures, wherein.

Figure 1:
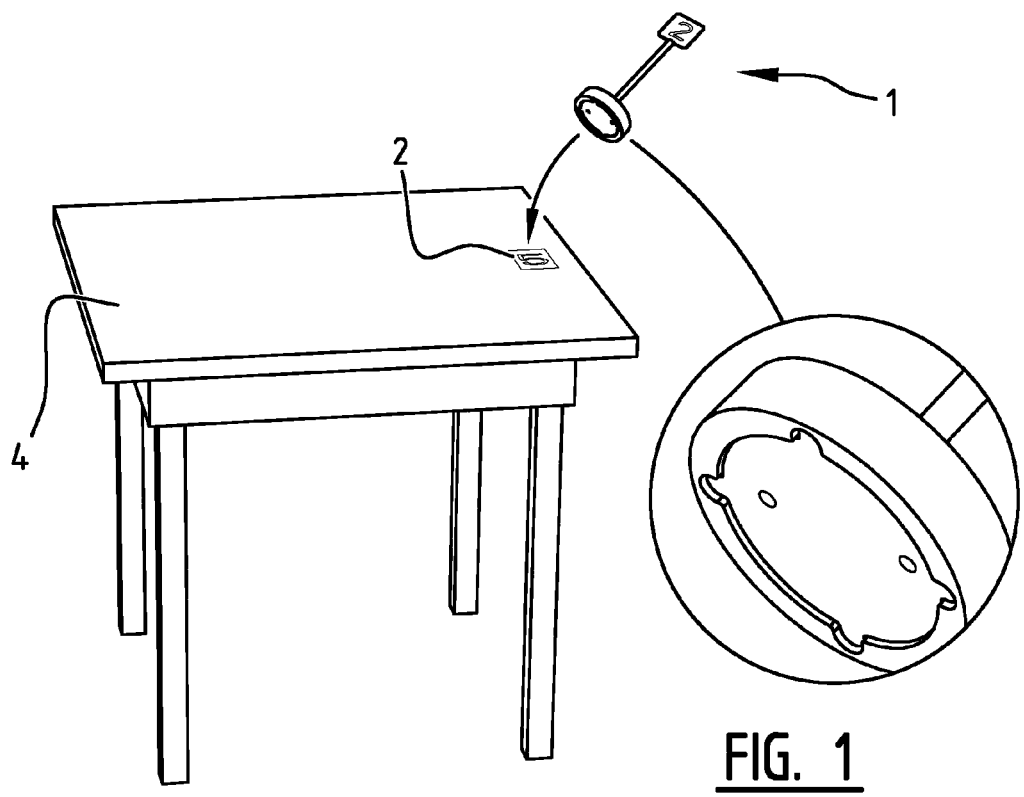
FIG. 1 is a perspective view of a table number system in accordance with the invention with a table number device in a first state.

According to the figures, a table number system comprises a multitude of table number devices 1, a multitude of table identifier tags 2 and a computer 3 loaded with restaurant or café order management software.

Tables 4 in a restaurant provided with a unique RFID table identifier tag 2, for instance in the form of a sticker on the table surface. The sticker may be provided with user instructions like "PLACE THE TABLE NUMBER HERE". The table number device 1 comprises a disc shaped pod 5, and a plate 6 on a pole 7. A visible table number is printed on the plate 6, and user instructions may also be printed on the device.

The pod 5 forms a housing for the electronic components and comprises a controller board 9 with a battery, power management means and wireless communication means which can communicate data received from the RFID reader to wireless communication means of the computer 3, an interface board 10 with the RFID reader and (preferably two) light sensors 8, and a transparent bottom cover 11.

Normally the RFID reader and the wireless communication means are off or in a sleep mode. When a client places an order at a central counter, he or she will receive a table number device 1 and be requested to find a table 4 in the restaurant or café and put the device 1 on the sticker with RFID tag 2.

Figure 2:
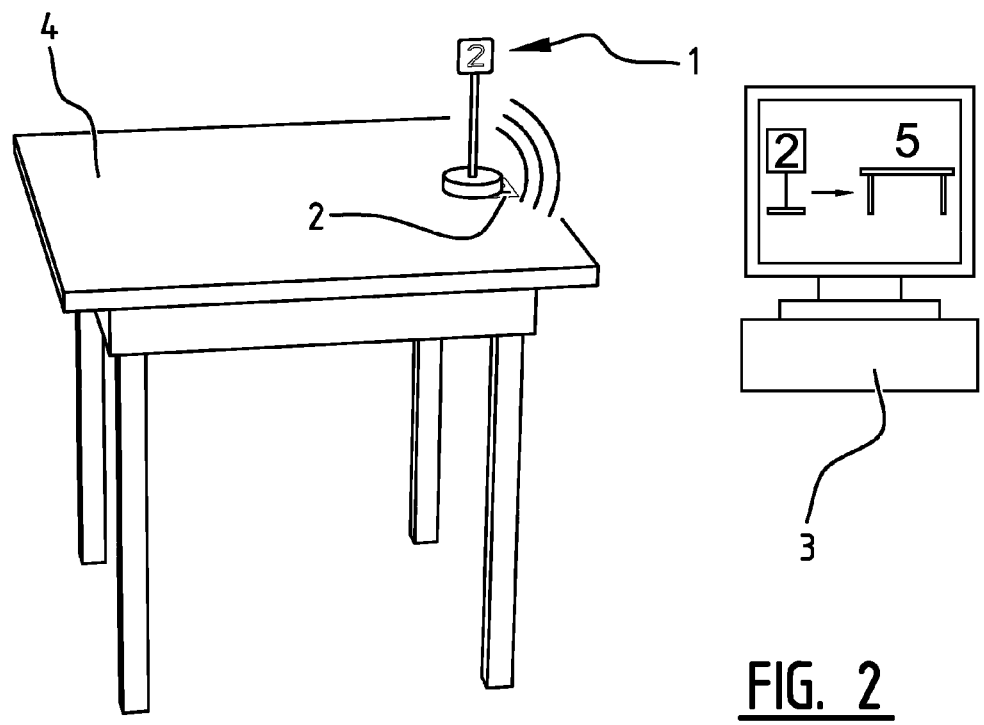
FIG. 2 is a perspective view of the table number system of FIG. 1 with the table number device in a second state.
Figure 3:
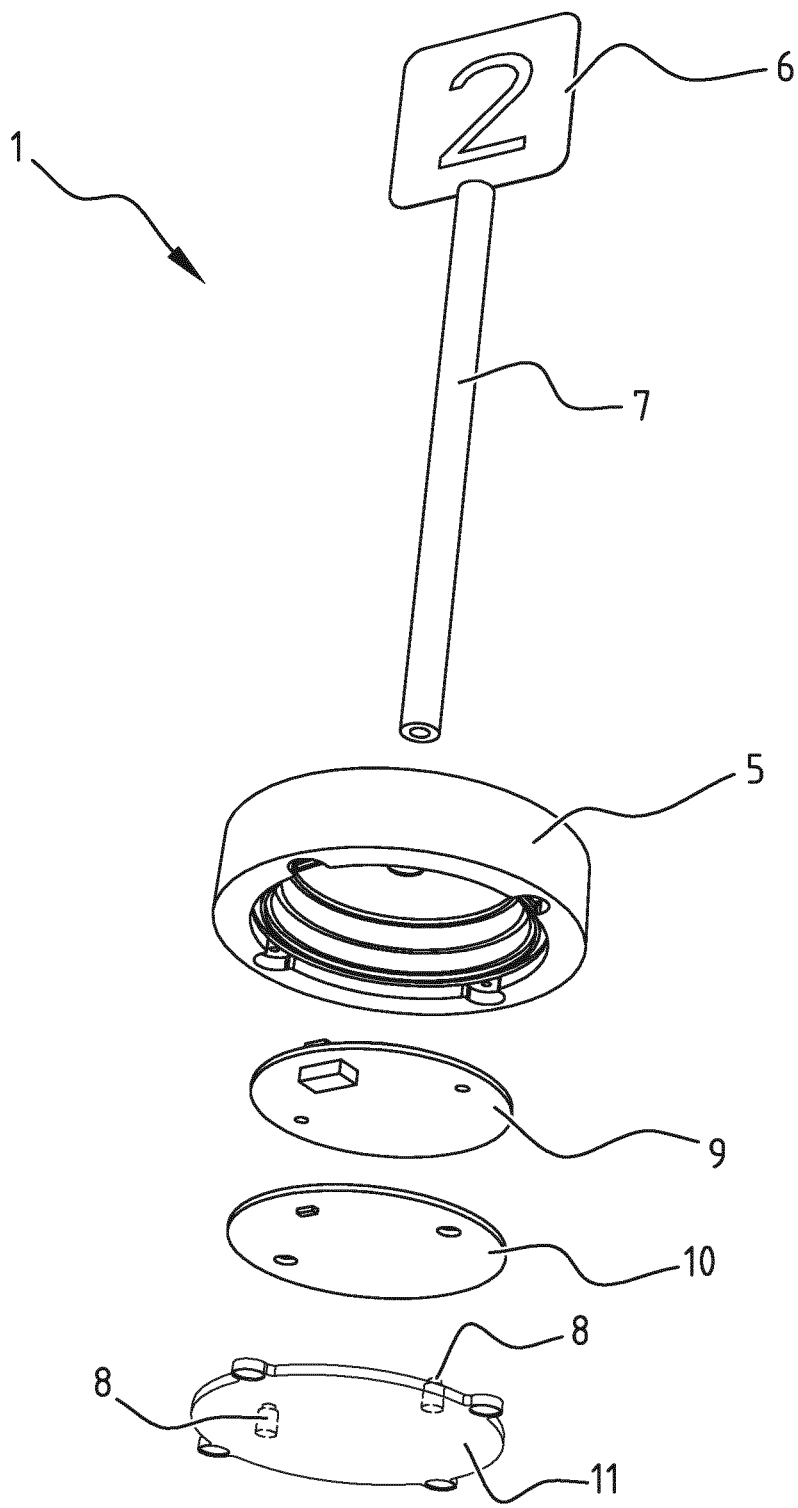
FIG. 3 is a perspective exploded view of the table number device of FIGS. 1 and 2.

When the pod 5 is moved from the position as shown in FIG. 1, wherein the bottom side of the pod 5 is uncovered, to the position as shown in FIG. 2, wherein the bottom side of the pod 5 is placed on the RFID tag 2 on the top surface of the table 4, the state of the light sensors 8 changes from "sensing light" to "not sensing light". The power management means, which are connected to the light sensors 8, is arranged to react to this event and power the RFID reader and the wireless communication means for a predetermined period of time, such that the RFID reader can detect any RFID table identifier tag 2 present, and the wireless communication means can communicate the detected table identifier ("5") together with the table number ("2") to the computer 3. Once this is completed, or if no RFID tag is detected in the predetermined period of time, the power management means put the RFID reader and the wireless communication means to sleep. The computer 3 is arranged to show the table number (actually order number) and the table identifier on the monitor or to print this on the order slip, such that the personnel know where to find the table number device 1 in order to deliver the order to the client. Alternatively, the location of the table number can be shown on a map of the layout of the restaurant or café by superimposing the active—not yet serviced—table numbers (order numbers) on top of the table symbols.

The invention has thus been described by means of a preferred embodiment. It is to be understood, however, that this disclosure is merely illustrative. Various details of the structure and function were presented, but changes made therein, to the full extent extended by the general meaning of the terms in which the appended claims are expressed, are understood to be within the principle of the present invention. The description and drawings shall be used to interpret the claims. The claims should not be interpreted as meaning that the extent of the protection sought is to be understood as that defined by the strict, literal meaning of the wording used in the claims, the description and drawings being employed only for the purpose of resolving an ambiguity found in the claims. For the purpose of determining the extent of protection sought by the claims, due account shall be taken of any element which is equivalent to an element specified therein.

The invention claimed is:

1. A portable table number device, comprising:
   a housing having a bottom side with an outer edge arranged to rest on a table surface, said housing comprising a power source;
   a radio frequency identification reader arranged to detect a radio frequency identification table identifier tag on or under said table surface;
   a computer memory disposed on a controller board within the housing comprising a table number device identifier;
   a wireless communication network arranged to wirelessly communicate a detected radio frequency identification tag table identifier by said radio frequency identification reader together with said table number device identifier to an external table number receiving device; and
   a surface proximity sensor arranged in a recessed portion of said housing within said outer edge, said surface proximity sensor having a first state wherein no proximate surface is detected and a second state wherein a proximate surface is detected, said second state occurring if said bottom side of said housing is placed on said table surface,
   wherein the controller board is configured to keep the radio frequency reader in a sleep mode wherein no or relatively little power is used until the state of said surface proximity sensor changes from said first state to said second state, to power up said radio frequency identification reader temporarily for a period of time if the state of said proximity sensor changes from said first state to said second state, said period of time being long enough to enable said radio frequency identification reader to identify radio frequency identification table identifier tag and transmit the detected table identifier to said external table number receiving device, and to put said radio frequency identification reader in said sleep mode after said period of time lapses.

2. The device in accordance with claim 1, wherein said controller board is arranged to put said radio frequency identification reader in said sleep mode once said radio frequency identification table identifier tag identification has been completed even if said period of time has not yet lapsed.

3. The device in accordance with claim 1, wherein said controller board is arranged to keep the wireless communication network in the sleep mode in sync with the radio frequency identification reader.

4. The device in accordance with claim 1, wherein said housing is provided with a visible identifier representing said unique table number device identifier, which is readable for an average person at a distance of at least several meters.

5. The device in accordance with claim 4, wherein said visible identifier is attached to said housing by means of an upright post.

6. The device in accordance with claim 1, wherein said power source is at least one of a battery, a capacitor and a solar panel.

7. The device in accordance with claim 1, wherein said wireless communication network is a WiFi communication network.

8. The device in accordance with claim 1, wherein said table number device comprises at least two of said surface proximity sensors a distance apart, and the controller board is arranged to power up the radio frequency identification reader for said period of time if the state of both of said surface proximity sensors changes from said first state to said second state.

9. The device in accordance with claim 1, wherein said surface proximity sensor is a light sensor, wherein said first state is a state wherein relatively much light is detected, and said second state is a state wherein relatively little or no light is detected.

10. The device in accordance with claim 1, wherein said surface proximity sensor is a micro-switch.

11. A table number system comprising a multitude of portable table number devices in accordance with claim 1, each table number device having a unique table number device identifier, a multitude of radio frequency identification table identifier tags, and a table number receiving device arranged to wirelessly receive said radio frequency identification tag table identifiers and said table number device identifiers and to communicate said table number device identifiers and radio frequency identification tag table identifiers, or the location thereof, to users of said table number system.

12. The system in accordance with claim 11, wherein said table number receiving device is a computer comprising software for managing client orders.

\* \* \* \* \*